United States Patent [19]

Yamada et al.

[11] 3,899,571
[45] Aug. 12, 1975

[54] METHOD FOR THE REMOVAL OF ORGANIC SUBSTANCES FROM SODIUM ALUMINATE SOLUTION

[75] Inventors: Koichi Yamada; Tadanori Hashimoto, both of Niihama; Kazuhiko Nakano, Katano, all of Japan

[73] Assignee: Sumitomo Chemical Company, Limited, Osaka, Japan

[22] Filed: Dec. 4, 1973

[21] Appl. No.: 421,638

[30] Foreign Application Priority Data
Dec. 6, 1972  Japan............................ 47-122189

[52] U.S. Cl. ............... 423/127; 260/527; 260/538; 423/130; 423/625
[51] Int. Cl.² ..... C01F 7/04; C01F 7/06; C01F 7/34
[58] Field of Search ........... 423/119, 120, 121, 127, 423/130, 551, 625, 629, 630; 260/538, 527

[56] References Cited
UNITED STATES PATENTS

| | | | |
|---|---|---|---|
| 2,935,376 | 5/1960 | Roberts, Jr. .......................... | 423/127 |
| 2,981,600 | 4/1961 | Porter.................................. | 423/121 |
| 3,372,985 | 3/1968 | Roberts, Jr. et al. ................ | 423/127 |
| 3,486,850 | 12/1969 | Day.................................... | 423/127 |
| 3,649,185 | 3/1972 | Sato et al............................ | 423/121 |

FOREIGN PATENTS OR APPLICATIONS

| | | | |
|---|---|---|---|
| 480,825 | 2/1952 | Canada.............................. | 423/121 |

*Primary Examiner*—Oscar R. Vertiz
*Assistant Examiner*—Gary P. Straub
*Attorney, Agent, or Firm*—Wenderoth, Lind & Ponack

[57] ABSTRACT

The present invention relates to a method for the removal of organic substances from a sodium aluminate solution in the production of alumina from bauxite in accordance with the Bayer process, the improvement which involves adding sodium oxalate crystals as seeds to a sodium aluminate solution for a time period which spans from after the aluminum hydroxide step to before the dissolution step, thereby precipitating organic substances mainly composed of sodium oxalate in the said sodium aluminate solution; separating the crystals of organic substances from the sodium aluminate solution, washing the said separated crystals with an aqueous solution to remove most of the organic substances newly deposited on the seeds from the separated crystals and recycling the sodium oxalate crystals as seeds for precipitating organic substances after the removal of substantially all of the newly deposited organic substances.

8 Claims, No Drawings

METHOD FOR THE REMOVAL OF ORGANIC SUBSTANCES FROM SODIUM ALUMINATE SOLUTION

The present invention relates to a method for the production of alumina from bauxite by the Bayer process or improved processes thereof (hereinafter inclusively referred to as the Bayer process). More particularly, the invention relates to a method for the efficient removal of organic substances such as sodium oxalate and so on in the sodium aluminate solution of the Bayer process.

As is well known, the production of alumina by the Bayer process comprises the steps of treating bauxite with hot alkali solution at a temperature generally above 130°C. to extract the alumina portions contained in the bauxite (the dissolution step); separating undissolved residues such as iron oxide, silicates, titanium oxide, and so on from the slurry obtained in the dissolution step; adding aluminum hydroxide as seeds to the clear sodium aluminate solution after the separation of the undissolved residues (hereinafter referred to as the Bayer solution); precipitating aluminum hydroxide at a temperature generally of 50° to 70°C. and separating the precipitated aluminum hydroxide from the sodium aluminate solution (the precipitation step); recycling a part of the precipitated aluminum hydroxide as seeds; removing the remaining aluminum hydroxide as the product; and recycling a part of sodium aluminate solution after separating aluminum hydroxide (hereinafter referred to as "spent liquor") and the other part of spent liquor followed by concentration procedure to the dissolution step of bauxite.

As the organic substances mainly composed of humus contained in the bauxite are extracted as soluble salts into the sodium aluminate solution in the bauxite dissolution step, and as a high molecular weight coagulant such as starch, sodium polyacrylate and so on is added as a precipitating agent in the separation step of red mud, organic substances are gradually accumulated in the sodium aluminate solution of the Bayer process.

These organic substances are present in the form of from humus to decomposed final products, for example, sodium oxalate. In the conventional Bayer process, these organic substances such as sodium oxalate precipitate as crystals together with aluminum hydroxide in the precipitation step while the solution is maintained at a low temperature for a long time. Since crystals of the organic substances such as sodium oxalate cannot be separated from the precipitated aluminum hydroxide, they are accumulated in the recycling seed aluminum hydroxide and hinder the crystal growth of the precipitated aluminum hydroxide, thus making it impossible to produce large grain aluminum hydroxide, or they come into the product aluminum hydroxide and lower its purity.

As a method for the removal of organic substances such as sodium oxalate, and so on, a process (U.S. Pat. No. 3,649,185) has been proposed which contains as a part of the process a step wherein sodium oxalate precipitated from the spent liquor after the separation of aluminum hydroxide are recycled as seeds to precipitate sodium oxalate. However, in this method for removing sodium oxalate from the spent liquor, there is a great disadvantage that the sodium oxalate seeds will lose the activity as seeds during recycling. That is to say, the seeds will lose the activity for preventing the occurence of fine particle sodium oxalate crystals and accelerating the precipitating rate of organic substances such as sodium oxalate and so on. Particularly, when fine particle sodium oxalate crystals develop, the sedimentation and filatration will become very difficult, which results in requiring very large apparatus. This is a fatal defect for industrial practice. Furthermore, the above process must be carried out in combination with various other steps than the foregoing step, and therefore is not an economical process.

Under the above circumstances, we made an intensive study to evalute the reason why the sodium oxalate crystal seeds lose the activity as seeds during recycling. As a result, we have found that the sodium aluminate solution contains, besides sodium oxalate, various other organic substances (humic substances), which by the addition of seeds deposit on the seeds together with sodium oxalate, and that because of this deposition, the surface activity of the seeds is lowered during recycling, and the seeds finally lose the original activity as seeds. The present invention has been accomplished on the basis of this finding.

In the production of alumina from bauxite by the Bayer process, the present invention provides a method for the rapid and economical removal of organic substances such as sodium oxalate and so on from the sodium aluminate solution by adding sodium oxalate crystals as seeds to the sodium aluminate solution from the precipitation step to the dissolution step thereby precipitating organic substances mainly composed of sodium oxalate in said sodium aluminate solution; separating the crystals from the sodium aluminate solution; washing the crystals with an aqueous solution having a pH of 5–12 to remove a substantial amount of the organic substances newly deposited on the seeds from the separated crystals; and recycling the sodium oxalate crystals as seeds for precipitating organic substances after the removal of the substantial amount of the organic substances.

The method of the present invention is explained in more detail in the following:

The removal of organic substances such as sodium oxalate and so on is carried out by adding sodium oxalate seed crystals to a spent liquor, in which sodium oxalate is supersaturated, obtained by evaporating, cooling or any other treatment. Such solutions are subjected to this procedure after the adjustment of the degree of supersaturation to above 0.02, preferably above 0.05. Since the equilibrium concentration of the sodium oxalate in the spent liquor decreases with the increase of the concentration of caustic soda, high concentration of caustic soda in the spent liquor is advantageous upon the addition of sodium oxalate seed crystals. Accordingly, it is particularly advantageous to cause the organic substances such as sodium oxalate and so on to precipitate by adding sodium oxalate seed crystals to a concentrated spent liquor, obtained by evaporating and cooling the spent liquor after the separation of aluminum hydroxide, in which the concentration of caustic soda, as expressed by $Na_2O$, is 130 to 400 g/l.

In the practice of the present invention, it is not always necessary to treat the whole amount of the spent liquor and a part of the spent liquor may be subjected to the treatment.

The amount of the addition of sodium oxalate seed crystals to the spent liquor is generally above about 30 weight percent, preferably about 50–30,000 weight percent, based on the amount of the sodium oxalate in the spent liquor. An amount of addition less than 30 weight percent is not desirable since such an amount will give rise to only a slight effect of addition. The upper limit of addition is decided in consideration of economic conditions.

The precipitation of the organic substances is generally carried out at a temperature from 0°C. to 75°C., preferably from 20°C. to 60°C. However, since the equilibrium concentration of the organic substances such as sodium oxalate and so on in the spent liquor lowers as the temperature lowers, it is advantageous to use a low temperature.

The spent liquor after the addition of sodium oxalate seed crystals is maintained under stirring generally for more than 10 minutes, preferably for 30 minutes to ten hours.

It has been verified that, by such a seed addition procedure, a substantial amount of the organic substances such as sodium oxalate and so on in the sodium aluminate solution deposits on the seeds.

The sodium oxalate seed crystals, after causing the organic substances such as sodium oxalate and so on in the spent liquor to deposit on the seed crystals, are separated from the sodium aluminate solution by known means of solid-liquid separation including sedimentation, filtration, centrifugation, and so on.

The separated crystals of the organic substances are sent to the step of washing off the organic substances newly deposited on the seeds, which is an important step of the present invention. This may be done after every separation or after the crystals are recycled generally five times or less as seeds provided that during this period the crystals still retain the activity as seeds, that is to say, the effect of preventing the occurence of fine particle crystals of sodium oxalate and accelerating the precipitating rate of sodium oxalate. However, it is desirable to send the separated crystals of the organic substances to the washing step after every separation.

The above step is carried out for the purpose of regenerating the activity of the recycling sodium oxalate seed crystals which have lost the activity as seeds by the organic substances other than sodium oxalate deposited thereon.

The crystals of the organic substances separated in the above step are washed with an aqueous solution having a pH of 5 to 12 to remove the organic substances newly deposited on the sodium oxalate seed crystals.

The aqueous solution usd for washing off the organic substances newly deposited on the sodium oxalate seed crystals may be any aqueous solution having a pH of 5 to 12, but water is particularly preferred. If the pH of the washing solution deviates from the above range, the solubility of the organic substances other than sodium oxalate is decreased, so that the organic substances other than sodium oxalate having no effect as seeds remain, and thus the improvement of the activity as seeds is not attained.

It is not always necessary to wash off all the amount of the organic substances newly deposited on the sodium oxalate seed crystals. All the amount of the newly deposited organic substances plus a part of the initial seed crystals may be washed off. In general, the amount to be washed off may range from an amount such that the seeds after the removal of a part of the newly deposited organic substances could become to have a certain degree of activity as seeds to an amount such that all the amount of the newly deposited organic substances plus 50 weight percent of the initial seed crystals are removed, preferably from an amount such that all the amount of the newly deposited organic substances is removed to an amount such that the latter plus 30 weight percent of the initial seed crystals are removed.

The washing-off step of the crystals of the organic substances deposited on the sodium oxalate seed crystals is carried out at a temperature generally below 100°C., preferably from room temperature to 60°C.

The amount of the washing solution is generally above 10 weight parts per one part of the newly deposited organic substances.

The washing may be carried out by spraying the washing solution onto the separated crystals of the organic substances, or by immersing the crystals into the washing solution.

The regenerated sodium oxalate seed crystals thus removed from the newly deposited organic substances are recycled to precipitate and separate the organic substances from the sodium aluminate solution, and the regenerated sodium oxalate seed crystals display the activity as seeds satisfactorily.

If the organic substances newly deposited on the sodium oxalate seed crystals are not suitably washed off, the seeds during recycling will completely lose the activity as seeds, for example, the effect of accelerating the precipitating rate of the organic substances such as sodium oxalate and so on, and the effect of preventing the occurence of fine particle sodium oxalate crystals. By the method of the present invention, such disadvantages are entirely eliminated.

In the case that a part of the initial sodium oxalate seed crystals are washed off, it is desirable that an amount of sodium oxalate crystals or solution corresponding to the washed-off amount be separately added.

In this case, the commercially available sodium oxalate crystals may be added separately or sodium hydrogen oxalate or sodium oxalate which is recovered from the following procedure may be recycled, wherein organic substances other than sodium oxalate is removed from an aqueous solution containing organic substances washed off from the seeds by the method of the present invention (1) by adjusting the pH to below 5 with a mineral acid such as hydrochloric acid, sulfuric acid, nitric acid, etc., or (2) by an adsorbing agent such as activated carbon, activated alumina, etc., and from the resulting solution sodium hydrogen oxalate or sodium oxalate is recovered. Alternatively, since sodium oxalate precipitates considerably rapidly as compared with humid substances, the sodium hydrogen oxalate or sodium oxalate solution after the above-mentioned mineral acid treatment or adsorption treatment may be recycled to the precipitation step of the organic substances so that crystals mainly composed of sodium oxalate are deposited on the seeds and then sodium oxalate and humic acid are further deposited thereon. The method of the present invention may be performed in any form of the batchwise, semi-continuous, or continuous system.

It is known that the complex salt of phosphorus, vanadium and so on precipitates when the Bayer liquor is maintained at low temperatures, and also that the complex salt has a large seed effect. So the method according to this invention may be applied for the removal of complex salt of phosphorus, vanadium and so on by recycling the mixture of sodium oxalate and the complex salt as the seed.

The spent liquor from which the organic substances is removed, is recycled to the Bayer process. On the other hand, the separated sodium oxalate can be used as a material for producing oxalic acid, or used for various other applications.

The present invention exhibits the following remarkable effects:

1. The seed activity of sodium oxalate seed crystals can be maintained for a very long time.
2. The organic substances such as sodium oxalate in the sodium aluminate solution in the Bayer process can be precipitated in a vey short time which is generally one twenty-fourth to one-fourth of the time required in an usual settling method.
3. The precipitation of the organic substances in the precipitation step of aluminum hydroxide can be avoided.

The method of the present invention is explained by examples in the following, but the invention is not limited by these examples.

EXAMPLE 1

A spent liquor after the precipitation (60°C.) and separation of aluminum hydroxide from the Bayer solution was evaporated and cooled to 50°C. To one liter of the thus-obtained spent liquor containing 2.8 g/l $Na_2C_2O_4$, 150 g/l $Na_2O$ and 77 g/l $Al_2O_3$, 20 grams of sodium oxalate crystals having an average particle diameter of 75 microns was added, and the resulting solution was maintained under stirring for one hour. After the crystals of the organic substances were separated by filtration, the crystals were placed in 30 ml water, and the water was stirred slowly for 60 minutes and filtered off. In this way, an amount of the organic substances corresponding to the amount newly deposited on the seeds was washed off. Then, to the same amount of the same spent liquor, 20 grams of the washed sodium oxalate seed crystals on a dry matter basis was added and the solution was treated in the same manner as above. This operation was repeated 20 times. The concentration of $Na_2C_2O_4$ and the presence or absence of fine particles in the decomposed solution after the separation of the organic substances by filtration in the 1st, 5th, 10th, 15th and 20th operations were observed. The results are shown in Table 1.

For purposes of comparison, a series of the same experiments were reproduced except that in each experiment 20 grams of sodium oxalate seed crystals was used repeatedly without washing. The concentration of $Na_2C_2O_4$ and the presence or absence of fine particles in the decomposed solution were observed and are shown as the comparative example in Table 1.

Table 1

| Separation (number of times) | Example according to the present invention | | Comparative example | |
|---|---|---|---|---|
| | Conc. $Na_2C_2O_4$ (g/l) | Presence of fine particles | Conc. $Na_2C_2O_4$ (g/l) | Presence of fine particles |
| 1 | 1.6 | No | 1.6 | No |
| 5 | 1.6 | No | 1.6 | Yes |
| 10 | 1.6 | No | 1.7 | Yes |
| 15 | 1.6 | No | 1.8 | Yes |
| 20 | 1.6 | No | 2.0 | Yes |

As apparent from Table 1, with the method of the present invention, the sodium oxalate can be removed quite effectively and the occurence of fine particles can be prevented.

EXAMPLE 2

To one liter of the same spent liquor as in Example 1, 10 grams of sodium oxalate crystals having an average particle diameter of 75 microns was added and the solution was maintained under stirring for two hours. After the crystals of the organic substances were separated by filtration, the crystals were placed in a 40 ml sodium hydroxide solution at pH 9. The solution was stirred slowly at 60°C. for 60 minutes and then filtered. In this way, an amount of the organic substances corresponding to the amount newly deposited on the seeds was washed off. Then, to the same amount of the same spent liquor solution, 10 grams of the washed sodium oxalate seed crystals (on a dry matter basis) was added, and the solution was treated in the same manner as above. This operation was repeated 20 times, and the concentration of $Na_2C_2O_4$ and the presence or absence of fine particles in the decomposed solution after the separation of the organic substances by filtration in the 1st, 5th, 10th, 15th and 20th operations were observed. The results are shown in Table 2.

For comparison, a series of the same experiments were repeated except that the crystals of the organic substances were put in (1) a 30 ml hydrochloric acid solution at pH 3 and (2) a 60 ml sodium hydroxide solution at pH 13, respectively, and each solution was stirred at 60°C. for 60 minutes and filtered off so to wash the seeds. The concentration of $Na_2C_2O_4$ and the presence or absence of fine particles in the spent liquor are also shown in Table 2 as the comparative example.

Table 2

| Separation (number of times) | Example by the present invention | | Comparative Example (1) | | Comparative Example (2) | |
|---|---|---|---|---|---|---|
| | (Conc. $Na_2C_2O_4$ (g/l) | Presence of fine particles | Conc. $Na_2C_2O_4$ (g/l) | Presence of fine particles | Conc. $Na_2C_2O_4$ (g/l) | Presence of fine particles |
| 1 | 1.6 | No | 1.6 | No | 1.6 | No |
| 5 | 1.6 | No | 1.6 | Yes | 1.6 | Yes |
| 10 | 1.6 | No | 1.6 | Yes | 1.7 | Yes |
| 15 | 1.6 | No | 1.7 | Yes | 1.8 | Yes |
| 20 | 1.6 | No | 1.8 | Yes | 2.0 | Yes |

It is seen from Table 2 that an aqueous solution at pH 5–12 is effective for washing.

EXAMPLE 3

To one liter of the same spent liquor as in Example 1, 20 grams of sodium oxalate crystals having an average particle diameter of 75 microns was added and the solution was maintained under stirring for one hour and allowed to stand. After the filtration of the crystals of the organic substances, the crystals were put in 55 ml water, and the water was stirred slowly at 50°C. for 60 minutes and filtered off. By this operation, the organic substances newly deposited on the seeds and 5 weight percent of the seeds were washed off. Then, to the same amount of the same decomposed solution, there were added 19 g. of the washed sodium oxalate seed crystals (on a dry matter basis) and 25 ml (corresponding to the amount of the washed-off sodium oxalate seed) of the sodium oxalate solution (conc.: 40 g/l) from which the organic substances is removed other than sodium oxalate by adding 50 g/l activated carbon to the solution remaining after washing the seed crystals. The spent liquor was then treated as mentioned above.

The above operation was repeated 20 times, and the concentration of $Na_2C_2O_4$ and the presence or absence of fine particles in the spent liquor after the separation of the organic substances by filtration in the 1st, 10th and 20th operations were observed. The results are shown in Table 3.

In place of the sodium oxalate solution to be added together with washed sodium oxalate seed crystals, one gram (corresponding to the amount of the washed-off sodium oxalate seed crystals) of sodium oxalate crystals (on a dry matter basis) obtained by concentrating the sodium oxalate solution and cooling it to 60°C., was added. The results are shown in Table 3.

Table 3

| Separation (number of times) | $Na_2C_2O_4$ added as solution | | $Na_2C_2O_4$ added as crystals | |
|---|---|---|---|---|
| | Conc. $Na_2C_2O_4$ (g/l) | Presence of fine particles | Conc. $Na_2C_2O_4$ (g/l) | Presence of fine particles |
| 1 | 1.65 | No | 1.6 | No |
| 10 | 1.65 | No | 1.6 | No |
| 20 | 1.65 | No | 1.6 | No |

EXAMPLE 4

This experiment was carried out in the same way as in Example 3 except for adding hydrochloric acid to the solution after washing in Example 3 to bring the pH of the solution to 1; stirring the solution for one hour and allowing it to stand to let humic substance precipitate and removing them; cooling the aqueous solution to 30°C. to let sodium hydrogen oxalate precipitate and dissolving it in water to a concentration of 100 g/l; and adding an amount of the resulting aqueous solution corresponding to the amount of the washed-off sodium oxalate seed crystals (one gram on a dry matter basis). The above operation was repeated 20 times and the concentration of $Na_2C_2O_4$ and the presence or absence of fine particles in the decomposed solution after the separation of the organic substances by filtration were measured. The results are shown in Table 4.

Table 4

| Separation (number of times) | Concentration of $Na_2C_2O_4$ (g/l) | Presence of fine particles |
|---|---|---|
| 1 | 1.6 | No |
| 10 | 1.6 | No |
| 20 | 1.6 | No |

We claim:

1. A method for the removal of organic substances from a sodium aluminate solution in the production of alumina from bauxite in accordance with the Bayer process or improved processes thereof, characterized by adding sodium oxalate crystals as seeds to a sodium aluminate solution during the time period extending from after the aluminate hydroxide precipitation step to before the dissolution step, thereby precipitating organic substances mainly composed of sodium oxalate in said sodium aluminate solution; separating the crystals of organic substances from the sodium aluminate solution; washing the said separated crystals with an aqueous solution having a pH of 5 to 12 to remove substantially all of the organic substances newly deposited on the seeds from the separated crystals; and recycling the sodium oxalate crystals as seeds for precipitating organic substances after the removal of substantially all of the newly deposited organic substances.

2. The method according to claim 1, wherein the precipitating procedure of the organic substances is carried out at a temperature from 0°C. to 75°C.

3. The method according to claim 1, wherein the amount of the addition of sodium oxalate seed crystals is about 50–30,000 weight percent based on the amount of the sodium oxalate in said sodium aluminate solution.

4. The method according to claim 1, wherein the sodium aluminate solution after the addition of sodium oxalate seed crystals is maintained under stirring 30 minutes to 10 hours.

5. The method according to claim 1, wherein said washing solution is water.

6. The method according to claim 1, wherein the amount of said separated crystals removed during washing ranges from an amount such that the seed after the removal of substantially all of the newly deposited organic substances have a seed activity to an amount such that all the amount of the newly deposited organic substances plus 50 weight percent of the initial seed crystals are removed.

7. The method according to claim 1, wherein the washing of said separated crystals is carried out at a temperature below 100°C.

8. The method according to claim 1, wherein the washing is carried out by spraying the washing solution onto the separated crystals or by immersing the separated crystals into the washing solution.

* * * * *